United States Patent

[11] 3,622,891

[72] Inventor Wayne H. Leland
Addison, Ill.

[21] Appl. No. 811,399
[22] Filed Mar. 28, 1969
[45] Patented Nov. 23, 1971

[73] Assignee Motorola, Inc.
Franklin Park, Ill.

[54] RADIO RECEIVER WITH AUTOMATIC CONTROL OF ATTENUATION FOR REDUCTION OF INTERMODULATION
9 Claims, 2 Drawing Figs.

[52] U.S. Cl. ........................................................ 325/381, 325/362, 325/383, 325/387, 325/411
[51] Int. Cl. ........................................................ H04b 1/18
[50] Field of Search ............................................ 325/362, 371, 380, 381, 383, 387, 411

[56] References Cited

UNITED STATES PATENTS

| | | | |
|---|---|---|---|
| 3,056,127 | 9/1962 | Harris | 325/22 X |
| 3,108,225 | 10/1963 | Midkiff | 325/387 X |
| 3,490,046 | 1/1970 | Russell | 325/411 |

*Primary Examiner*—Robert L. Griffin
*Assistant Examiner*—Kenneth W. Weinstein
*Attorney*—Mueller and Aichele

ABSTRACT: An automatic control system for a communications receiver automatically increases the attenuation of a frequency selective stage, preferably near the input of the receiver, when signals above a certain strength are received. A variable reactance device is coupled to a section of a multisection helical resonator for changing the resonant frequency of the section and thereby increasing the attenuation of the resonator when strong signals are received. The variable reactance device is coupled to the resonator in a manner so that it does not contribute to the production of intermodulation in the receiver.

INVENTOR
WAYNE H. LELAND

BY Mueller, Aichele & Rauner

ATTYS.

RADIO RECEIVER WITH AUTOMATIC CONTROL OF ATTENUATION FOR REDUCTION OF INTERMODULATION

BACKGROUND OF THE INVENTION

It is known in the radio communication art that a strong received signal often intermodulates with another signal in certain stages of a radio receiver. Thus, the first-tuned stage in a frequency modulation communication receiver may not provide sufficient attenuation to prevent intermodulation at certain levels of the desired input signal with signals in adjacent channels. The problem of such signal interference can become particularly acute in mobile communication systems where a receiver may, on some occasions, be in weak signal areas, and on other occasions be in strong signal areas. Intermodulation interference becomes more severe in the presence of strong signals. Some adjustment in the sensitivity of the equipment may be desired or even necessary in order to insure proper reception of weaker signals as well as stronger signals, under different signal strength conditions. It is desirable to locate any such adjustments before any nonlinear stages in the receiver so that intermodulation is not created before it is controlled.

One type of automatic sensitivity control which has been proposed for use in radio communication receivers regulates the transmission of signal energy through the receiver by controlling the high-frequency coupling between stages in the receiver. This may be accomplished by use of voltage variable capacitor to couple between stages in the receiver. This control arrangement has the disadvantage that when the voltage variable capacitor coupling the receiver stages is followed by a transistor stage employing a field effect transistor, the intermodulation products due to strong signals are generated in the voltage variable capacitor at a lower signal level than the field effect transistor, thus, causing the receiver specifications to be limited by the automatic sensitivity control which is provided to improve those specifications.

Another disadvantage is that variable intercoupling between receiver stages cannot be conveniently employed in communication receivers operating in the UHF (ultra high-frequency or higher ranges. UHF receivers may use a cast metal coaxial helical resonator having a number of sections, with intercoupling between the sections being accomplished by means of apertures in the shields about the sections. These apertures are designed to have an equivalent electrical reactance, which cannot be conveniently varied by the use of discrete components. Other methods must, therefore, be employed to vary the attenuation in these receivers.

SUMMARY OF THE INVENTION

It is, therefore, an object of this invention to provide a simple, efficient, and reliable automatic system for controlling the transfer of energy in radio frequency stages of wave signal translating apparatus to minimize intermodulation products therein.

Another object of this invention is to provide a communication receiver capable of improved reception of closely spaced signals of various signal strengths.

Still another object of the invention is to provide a control circuit for automatically controlling the attenuation of a helical-type coaxial resonator employed in a UHF communication receiver.

A further object of this invention is to provide a circuit for increasing the attenuation of a signal-selecting circuit in a communication receiver without contributing to the intermodulation interference.

A feature of the invention is the provision of an improved communication receiver, wherein a capacitive reactance, the impedance of which is automatically controlled by a control potential related to the received signal strength, is coupled to one stage of a multistage tuned circuit, or to one section of a helical resonator, to substantially change the resonant frequency of that stage or section, thereby increasing the attenuation of the multistaged tuned circuit or resonator.

In practicing this invention there is provided an automatic control system for a communication receiver which automatically increases the attenuation of a stage when signals above a certain strength are received. The system includes a variable reactance device coupled to one section of a multisection helical resonator, or one stage of a multistage tuned circuit in the receiver, which is responsive to a control signal for changing the resonant frequency of that section or stage respectively. The change in resonant frequency of one section or stage of the helical resonator or multistage tuned circuit increases the attenuation of the entire resonator or tuned circuit and prevents signals coupled to the first active stage from exceeding a predetermined level thereby reducing the tendency for intermodulation of the receiver. In one form the variable reactance device includes a capacitive member and diode coupled between the output terminal of a helical resonator and a ground potential. A direct current bias potential is applied to one terminal of the diode causing it to be reversed biased. A direct current control potential responsive to received signal strength is applied to the second terminal of the diode. As the signal strength coupled to the receiver increases the direct current control potential across the diode increases causing the diode to conduct and provide a ground path for the capacitor. In this way the reactance of the capacitor is added in parallel with the last section of the helical resonator causing a change in its resonant frequency, and thereby increasing the attenuation of the resonator. The capacitor is selected to have a high impedance at the desired frequency so that very little signal energy appears across the diode, thus preventing the production of intermodulation in the diode. The direct current control potential necessary to forward bias the diode may be controlled from a stage of the receiver providing rectified signals which vary in accordance with strength of received signals.

DETAILED DESCRIPTION OF THE INVENTION

Figure 1:
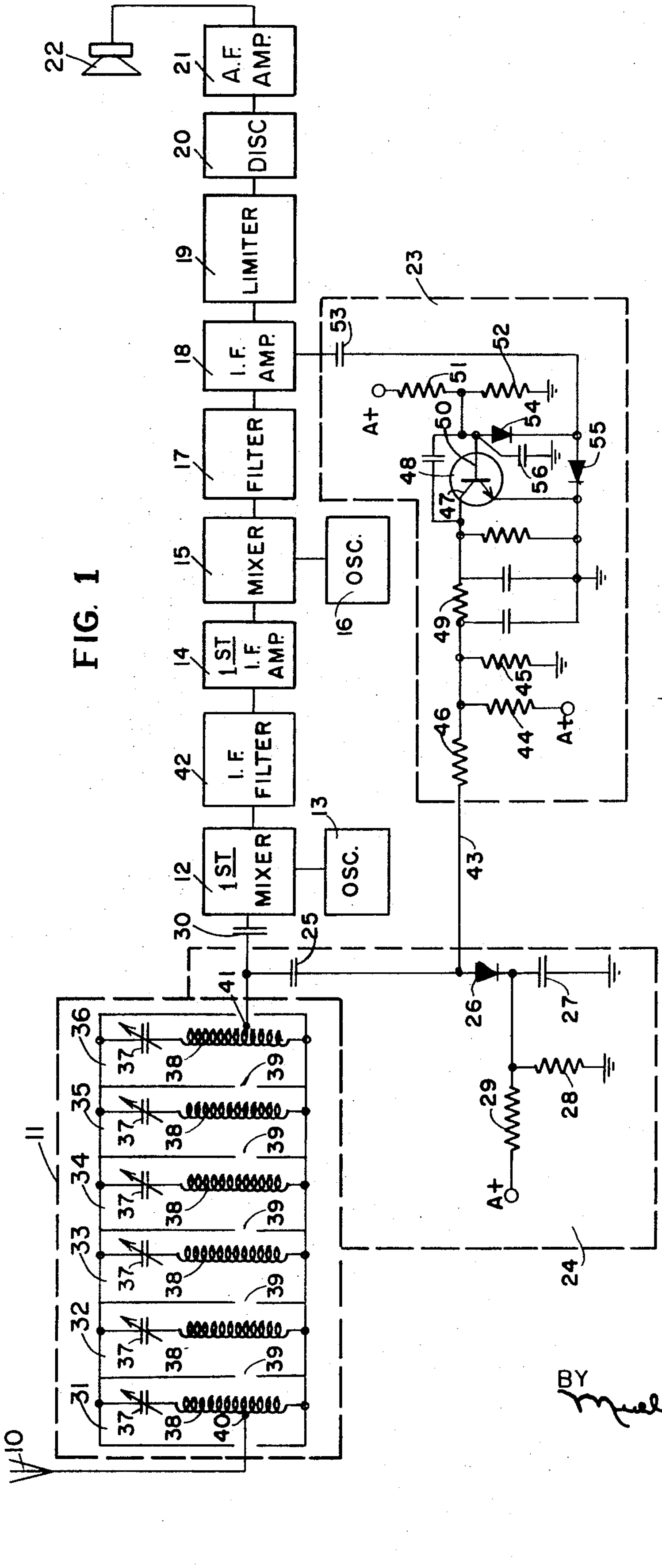
FIG. 1 is a schematic and block diagram of a radio receiver incorporating the invention.

Referring to FIG. 1 of the accompanying drawing, a communication frequency modulation receiver embodying the invention is shown which includes a first frequency selective stage 11 to which a received signal is applied from antenna 10. Frequency selective stage 11 selects the desired received signal which is then applied to a mixer circuit 12 where the signal is heterodyned with a signal from a first oscillator 13, and the resultant output is then applied to an intermediate frequency filter 42 which attenuates the adjacent channel signals. The output of filter 42 is then applied to intermediate frequency amplifier 14. A second mixer circuit 15 may be provided for heterodyning the signal with another signal from a second oscillator 16, to produce a still lower intermediate frequency signal. This is applied through a passive filter section 17 to a second intermediate frequency amplifier 18. Amplifier 18 may include any number of stages, the last one of which feeds a limiter circuit 19. The signal is then applied to a discriminator network 20 where the frequency-modulated intelligence (audio-modulating signal) is recovered. After further amplification in an audio amplifier 21, the audio-modulating signal is applied to a loudspeaker 22 or other reproducing device for translating the received signal. The operation of the receiver as briefly described thus far is known in the art and may be seen to be that of a double-conversion superheterodyne frequency modulation radio receiver, although the invention may be used in other types of equipment as is apparent from the following description.

Referring to the selective stage 11 in greater detail, this stage 11 is comprised of a helical resonator containing six sections 31 to 36. Each section contains a helical inductor 38, and a variable air capacitor 37 connected in parallel. Sections 31 to 36 of resonator 11 are coupled together by means of apertures 39 in the shields between the sections. These apertures have an equivalent electrical reactance to produce a frequency-selective network which may be tuned to the desired signal by means of capacitors 37. The antenna 10 is coupled to tap 40 on inductor 38 of section 31 of helical resonator 11. Signals passing through the helical resonator 11 are coupled from a tap 41 on inductor 38 of section 36 through coupling capacitor 30 to the first mixer 12.

In accordance with the present invention, a variable reactance device 24 is coupled to tap 41 on inductor 38 of section 36 of helical resonator 11. The variable reactance device includes a capacitor 25, diode 26 and signal bypass capacitor 27, coupled in series between the output tap 41 of helical resonator 11 and ground potential. Capacitor 25 is selected to have a value such that it will have a high impedance at the desired frequency so that only small amounts of signal energy will appear across diode 26. As capacitor 25 is coupled from ground potential to tap 41 of inductor 38, the value of this capacitor will cause the resonant frequency of section 36 to change. Resistors 28 and 29, coupled to one terminal of diode 26 form a voltage divider connected to direct current supply potential A+, and provide a reverse bias potential to this terminal of diode 26. A direct current control potential is applied to the other terminal of diode 26 by means of lead 43.

The direct current control potential is developed in a suitable rectifier switch network 23. The control potential is derived from a voltage divider formed by resistors 44 and 45 connected to direct current supply potential A+. The direct current control potential developed at the junction of resistors 44 and 45 is coupled through resistor 46 to the lead 43. The action of the divider is modified by transistor 48 whose collector 47 is coupled through resistor 49 to the junction of resistors 44 and 45. Transistor 48 is rendered conductive by a bias voltage developed at the junction of resistors 51 and 52 and coupled to its base 50. The low-impedance path to ground provided at the junction of resistors 44 and 45 when transistor 48 is rendered conductive reduces the level of the direct current control potential applied to the lead 43 and prevents diode 26 from being forward biased.

Signals appearing in the second intermediate frequency amplifier 18 are coupled through direct current blocking capacitor 53 to diodes 54 and 55. The negative portion of the intermediate frequency signal is rectified by diode 54 causing a negative voltage to be developed across capacitor 56 and coupled to base 50 of transistor 48. As the signal strength translated by the receiver increases, the negative voltage across capacitor 56 increases and begins to render transistor 48 nonconductive, thereby increasing the impedance in the direct current path to ground provided at the junction of resistors 44 and 45. This causes the direct current control potential applied by lead 43 to diode 26 to increase. It is therefore seen that the direct current control potential varies in accordance with the signal received by the receiver.

Figure 2:
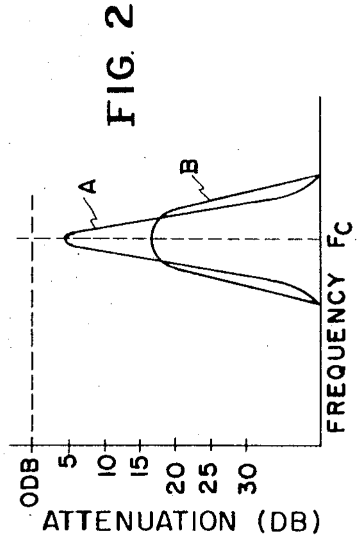
FIG. 2 is a graphical representation helpful in understanding the operation of the invention.

When weak signals of a predetermined amplitude are received by antenna 10, they are coupled through helical resonator 11 to the first mixer 12. For this low signal level, a given direct current control potential is taken from network 23 and applied to diode 26 causing it to be reverse biased. With diode 26 reverse biased, capacitor 25 is not coupled to ground. The resonant frequency of section 36 of helical resonator 11 is not affected by the capacitor 25 and therefore the attenuation of helical resonator 11 at the desired frequency does not change. Curve A of FIG. 2 illustrates the attenuation characteristics of helical resonator 11 for this predetermined weak signal.

When the received signal rises above the predetermined low level, the direct current control potential taken from network 23 rises and overcomes the reverse bias, causing diode 26 to conduct in the forward direction. A low-impedance ground path is now provided for capacitor 25 so that its capacitance is added to the section 36, causing the resonant frequency of section 36 in helical resonator 11 to change. With section 36 of helical resonator 11 resonant at a frequency other than the desired frequency, the attenuation of helical resonator 11 is increased as shown by curve B of FIG. 2. This causes the signal coupled to the first mixer 12 to decrease. Further increases in received signal strength will again cause an increase in the control potential, further increasing the forward bias on diode 26 and decreasing the impedance thereof and of the path to ground for capacitor 25. This causes a further change in resonant frequency of section 36 which will cause the attenuation of helical resonator 11 at the desired frequency to further increase. This further decreases the amount of signal coupled to the first mixer 12. The change in attenuation of resonator 11 by use of the automatic control system is substantially linear with increasing signal and a dynamic range of the order of 30 decibels of additional attenuation can be provided.

It will be understood that, in place of the rectifier switch circuit 23, any suitable source of direct current control potential which varies with the amplitude of the received signal may be used. Also, a reactance other than capacitor 25 may be coupled to the resonator 11 to change the tuning thereof and thereby change the attenuation. Further, the diode 25 can be replaced by another form of switch such as a transistor semiconductor device, or any variable impedance device.

It can be seen that this invention provides a simple, efficient and reliable system for reducing the tendency for intermodulation of signals in a communication receiver. The system provides automatic response to signals of increased strength so that the signals are attenuated, without contributing to the production of intermodulation in the communication receiver. In addition the system may be employed to increase the attenuation of a helical resonator thereby providing intermodulation protection for communication receivers operating in the UHF and high-frequency bands.

I claim:

1. A wave signal intermodulation attenuation system for coupling an antenna to a radio receiver including in combination, a receiver circuit having a translating stage having nonlinear characteristics responsive to signals coupled thereto below a first signal level to produce first intermodulation effects, and responsive to signals coupled thereto in excess of said first level to produce undesired intermodulation effects, a tuned circuit portion having a plurality of tuned circuit sections coupled together, said tuned circuit portion coupling said antenna to said translating stage, said tuned circuit sections coupling the desired signals of a channel frequency therethrough, said tuned circuit portion having a predetermined selectivity and attenuation of signals coupled therethrough, circuit means coupled to a tuned circuit section of said tuned circuit portion for changing the resonant frequency of said section in response to a direct current potential applied thereto, means providing a direct current potential which varies in accordance with the strength of signals translated by the receiver, and means applying said direct current potential to said circuit means thereby changing the resonant frequency of said secton of said tuned circuit portion, said tuned circuit portion being operative to increase the attenuation of said signals coupled therethrough in response to said change in resonant frequency of said tuned circuit section to thereby prevent said signals from exceeding said first level.

2. The wave signal intermodulation attenuation system of claim 1 wherein said receiver circuit tuned circuit portion is a coaxial helical resonator having a plurality of sections for providing selectivity.

3. The wave signal intermodulation attenuation system of claim 2 wherein said coaxial helical resonator includes an input section, an output section and sections therebetween to form a multisection resonator, said input section and said output section having an input terminal and an output terminal respectively, and wherein said circuit means is coupled to one of said terminals.

4. The wave signal intermodulation attenuation system of claim 1 wherein said receiver circuit tuned circuit portion includes a plurality of resonant tuned circuits reactively intercoupled to form a multistage tuned circuit for providing the selectivity thereof.

5. The wave signal intermodulation attenuation system of claim 1 wherein said circuit means includes reactance means and semiconductor switch means, said means for providing a direct current potential being coupled to said semiconductor switch means to control the conductivity thereof in accordance with the strength of the translated signals, said semiconductor switch means controlling the coupling of said reactance means to said section of said tuned circuit portion of said receiver circuit to change the resonant frequency thereof.

6. The wave signal intermodulation attenuation system of claim 6 wherein said semiconductor switch means is a diode.

7. The wave signal intermodulation attenuation systems of claim 6 wherein said reactance means is a capacitor.

8. The wave signal intermodulation attenuation system of claim 1 wherein said circuit means includes first reactance means coupled to said section of said tuned circuit portion of said receiver circuit, semiconductor switch means coupled to said first reactance means and having at least first and second terminals, second reactance means coupled to said switch means and to a reference potential, means providing a bias potential coupled to said second terminal of said switch means for rendering the same nonconductive, and wherein said means for providing a direct current potential is coupled to said first terminal of said switch means and acts to render the same conductive in response to translated signals which exceed said first level, said switch means when conductive coupling said first reactance means to said portion of said receiver circuit to change the resonant frequency thereof.

9. The wave signal intermodulation attenuation system of claim 9 wherein said first reactance means is a capacitor.

* * * * *